(12) United States Patent
Bell

(10) Patent No.: US 10,406,929 B2
(45) Date of Patent: Sep. 10, 2019

(54) CHARGE COIL POSITIONING AND DATA ENCODING MAGNET ARRAYS FOR VEHICLE CHARGING

(71) Applicant: Ford Global Technologies, LLC, Dearborn, MI (US)

(72) Inventor: Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/648,497

(22) Filed: Jul. 13, 2017

(65) Prior Publication Data
US 2019/0016227 A1 Jan. 17, 2019

(51) Int. Cl.
| | |
|---|---|
| *H02J 7/00* | (2006.01) |
| *B60L 11/18* | (2006.01) |
| *H02J 7/02* | (2016.01) |
| *H02J 50/10* | (2016.01) |
| *H02J 50/80* | (2016.01) |
| *B60L 53/12* | (2019.01) |
| *B60L 53/39* | (2019.01) |

(52) U.S. Cl.
CPC ........... *B60L 11/1831* (2013.01); *B60L 53/12* (2019.02); *B60L 53/39* (2019.02); *H02J 7/025* (2013.01); *H02J 50/10* (2016.02); *H02J 50/80* (2016.02); *H02J 2007/0096* (2013.01)

(58) Field of Classification Search
CPC ............. H02J 7/025; H02J 50/12; H02J 50/10
USPC ......................................................... 320/108
See application file for complete search history.

(56) References Cited

U.S. PATENT DOCUMENTS

| | | | |
|---|---|---|---|
| 8,912,687 B2 | 12/2014 | Kesler et al. | |
| 8,946,938 B2 | 2/2015 | Kesler et al. | |
| 9,564,776 B2 | 2/2017 | Lampinen | |
| 2012/0235636 A1* | 9/2012 | Partovi | H02J 7/025 320/108 |
| 2017/0126070 A1* | 5/2017 | Lee | H02J 50/80 |
| 2017/0240055 A1* | 8/2017 | Nguyen | B60L 11/182 |

FOREIGN PATENT DOCUMENTS

WO 2016/072981 A1 5/2016

\* cited by examiner

*Primary Examiner* — Nghia M Doan
(74) *Attorney, Agent, or Firm* — David B. Kelley; Brooks Kushman P.C.

(57) ABSTRACT

A charging facility includes a primary coil, magnets arranged relative to the primary coil in a pattern such that fields generated by the magnets can be used to position a vehicle relative to the primary coil, and a controller. Some of the magnets have a predefined polarity signature encoding data regarding an identify of the primary coil. The controller is programmed to receive information from or provide information to the vehicle about the predefined polarity signature.

4 Claims, 2 Drawing Sheets

CHARGE COIL POSITIONING AND DATA ENCODING MAGNET ARRAYS FOR VEHICLE CHARGING

TECHNICAL FIELD

This disclosure relates to arrays of magnets used to assist in positioning primary and secondary coils for vehicle charging, and to encode data therein.

BACKGROUND

Certain electrified or alternatively powered vehicles may include a traction battery that can be used to power an electric machine to drive wheels. These vehicles may also include an engine that can be used to drive the wheels.

Power may be captured and stored in the traction battery via regenerative braking or charge operations. Certain charge operations may include inductive charging in which a vehicle mounted secondary coil arrangement is coupled with a charge station primary coil arrangement for power transfer therebetween. Such power transfer requires the coils to be properly positioned relative to one another. Moreover, for charge stations having multiple primary coil arrangements, such power transfer requires the charge station and vehicle to agree upon which of the primary coil arrangements will be used.

SUMMARY

A charging facility includes a primary coil, magnets arranged relative to the primary coil in a pattern such that fields generated by the magnets can be used to position a vehicle relative to the primary coil, some of the magnets having a predefined polarity signature encoding data regarding an identify of the primary coil, and a controller programmed to receive information from or provide information to the vehicle about the predefined polarity signature.

A charging facility includes a primary coil, electromagnets arranged relative to the primary coil in a pattern such that fields generated by the electromagnets can be used by a vehicle to position the vehicle relative to the primary coil, and a controller programmed to encode data regarding an identify of the primary coil via polarity or changes in polarity of some of the electromagnets.

A vehicle includes a secondary coil, magnets arranged relative to the secondary coil in a pattern such that fields generated by the magnets can be used to position a charging facility primary coil relative to the secondary coil, some of the magnets having a predefined polarity signature encoding data regarding an identify of the vehicle, and a controller programmed to receive information from or provide information to a charging facility about the predefined polarity signature.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 1:
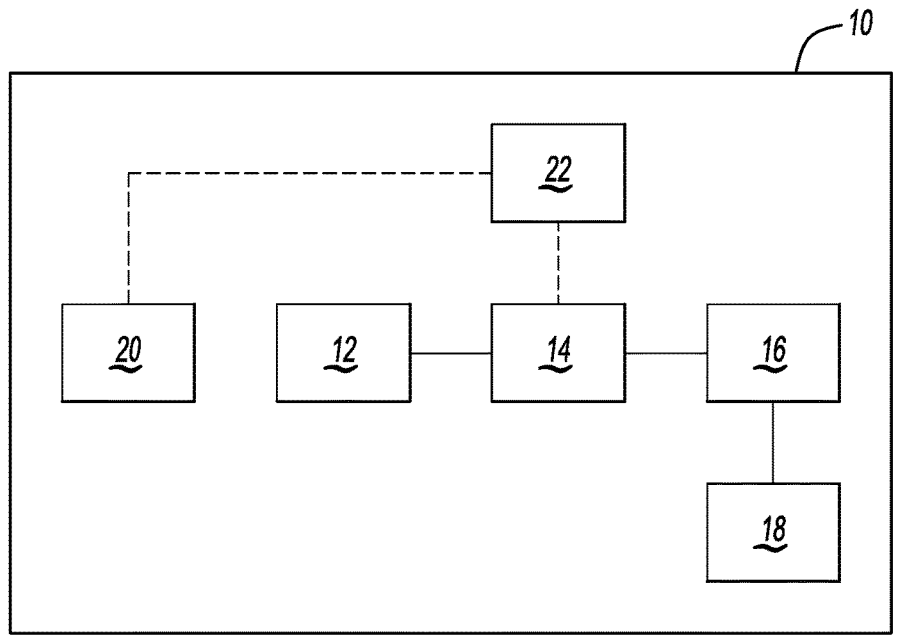
FIG. 1 is a schematic diagram, in plan view, of portions of a vehicle power system.

Referring to FIG. 1, a vehicle 10 may include a secondary coil 12, power electronics 14, a traction battery 16, an electric machine 18, magnetometers 20, and a controller 22. (Solid lines indicate power flow paths. And dashed lines indicate communication paths.) Power received from the secondary coil 12 via inductive charging may be conditioned by the power electronics 14 and passed to the traction battery 16 for storage. The traction battery 16 may then provide this power to the electric machine 18 to drive wheels (not shown) of the vehicle 10.

The magnetometers 20 are positioned relative to the secondary coil 12 such that magnetic fields detected by the magnetometers 20 from magnets associated with a primary coil (discussed in further detail below) may be used by the controller 22 to identify, for example, a relative position between the secondary coil 12 and primary coil, and to identify and distinguish the primary coil from other primary coils.

Figure 2:
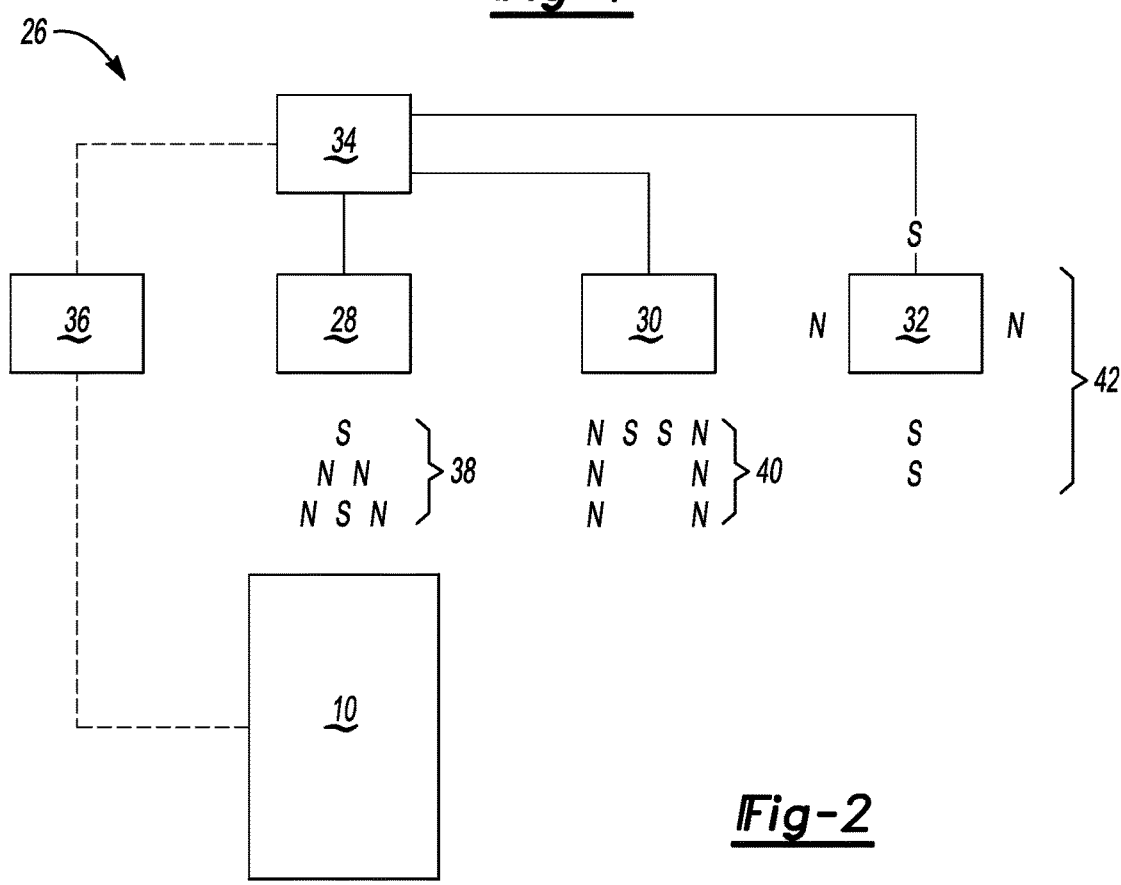
FIG. 2 is a schematic diagram, in plan view, of a battery charging facility showing the vehicle of FIG. 1 approaching a selected one of the charging stations.

Referring to FIG. 2, the vehicle 10 is shown approaching a battery charging facility 26. The battery charging facility 26 includes a plurality of spaced apart primary coils (represented by primary coils 28, 30, 32), a power source 34, a controller 36, and several permanent magnet arrays 38, 40, 42 respectively associated with the primary coils 28, 30, 32. (As with FIG. 1, solid lines indicate power flow paths, and dashed lines indicate communication paths.) The controller 36 may command the power source 34 to provide power to a select one (or more) of the primary coils 28, 30, 32 as is known in the art. This command may be prompted by a request from the vehicle 10, etc.

Given the plurality of primary coils 28, 30, 32, the vehicle 10 and the controller 36 need to identify which will be used for charging purposes. Thus, the vehicle 10 and battery charging facility 26 may exchange communications about which of the primary coils 28, 30, 32 are to be used. The controller 36, for example, may indicate to the vehicle 10 that it is to use the primary coil 30 (if it is marked as such so as to be visible to a driver of the vehicle 10) or, responsive to input by the driver, the vehicle 10 may indicate to the controller 36 that it intends to use the primary coil 30. As discussed in further detail below, the permanent magnet arrays 38, 40, 42 serve as magnetic guideposts of sorts to assist in guiding vehicles toward their corresponding primary coils while at the same time conveying data about their corresponding primary coils and/or charge capabilities of the battery charging facility 26.

The permanent magnet array 38 includes, in this example, a plurality of permanent magnets (represented by "N" and "S") mounted in-ground and arranged in rows of decreasing order such that rows closer to the primary coil 28 have fewer permanent magnets than rows further away from the primary coil 28. Provided a vehicle, such as the vehicle 10, has the capability to detect magnetic fields, such as the magnetometers 20, associated with the permanent magnet array 38, movement in the direction of decreasing number of magnetic fields or decreasing net magnetic field strength can be interpreted as moving toward the primary coil 28, whereas movement in the direction of increasing number of magnetic fields or increasing net magnetic field strength can be interpreted as moving away from the primary coil 28. That is, the arrangement of the permanent magnet array 38 can assist in guiding/positioning a vehicle relative to the primary charge coil 28. (Data about the expected arrangement of the permanent magnet array 38 may be communicated to the vehicle 10 via a wireless or other communication path by the controller 36 or other transmission source.)

While the relative placement of the permanent magnets of the permanent magnet array 38 may serve as magnetic field guides for vehicle positioning, a polarity of the permanent magnets may encode various data about the primary coil 28. In the example of FIG. 2, the row of permanent magnets furthest from the primary coil 28 has a north-south-north "N S N" magnetic signature; the row of permanent magnets closest to the primary coil 28 has a south "S" magnetic signature; and the row of permanent magnets between the furthest and closest rows has a north-north "N N" magnetic signature. Some or all of this polarity data may be used to confirm which of the primary coils 29, 30, 32 the vehicle 10 is approaching. As part of any hand-shake authentication process between the vehicle 10 and the controller 36, the controller 36 may prompt the vehicle 10 to provide some or all of the polarity data it encounters while travelling over the permanent magnet array 38. Assuming that each of the permanent magnet arrays 38, 40, 42 has unique polarity signatures, the polarity data can be used by the controller 36 to confirm that the vehicle 10 is approaching the correct primary coil. So even if other primary coils (not shown) have associated permanent magnet arrays (not shown) with the 3-2-1 arrangement of permanent magnets, their unique polarity signatures can be used to distinguish them from each other. (Another such permanent magnet array may, for example, have "S S S," "S S," and "S" polarity signatures, etc.)

Still further, certain of the polarity signatures may be used for primary coil identification while other of the polarity signatures may be used for conveying data about maximum charge rate, coil-type (e.g., mono pole, dual pole), etc. With reference again to the permanent magnet array 38, the polarity signature of the row furthest from the primary coil may be used, for example, to encode data to identify the particular primary coil being approached, while the remaining rows may be used to encode data regarding charge process particulars. A "S" polarity signature for the row closest to the primary coil 28 may indicate a mono pole coil arrangement whereas a "N" polarity signature may indicate a dual pole coil arrangement. A "N N" polarity signature for the row between the furthest and closest rows may indicate that the primary coil 28 permits a fast charge option whereas a "N S" or "S S" polarity signature may indicate that no such fast charge option is available. Other data about charge related (or other) parameters may also be so encoded.

Responsive to reading the data encoded in the permanent magnet array 38, the vehicle 10 may further communicate with the controller 36 and prepare its power system for charging accordingly. To the extent, for example, that data regarding a maximum permissible charge rate is encoded in the permanent magnet array 38, the vehicle may request a particular charge rate (less than or equal to the maximum) without the controller 36 having to communicate or otherwise provide to the vehicle 10 the limit. Other scenarios are also contemplated.

The permanent magnet array 40 shows an alternative arrangement. This 2-2-4 arrangement, however, may assist in guiding a vehicle toward the primary coil 30 and encode data in a manner similar to that described with respect to the permanent magnet array 38. Here, for example, the polarity signature closet to the primary coil 30 may be used to encode data that distinguishes the primary coil 30 from others. The other rows may be used to encode data about charge related (or other) parameters.

The permanent magnet array 42 also shows an alternative arrangement. This 1-1-2-1 arrangement, instead of being completely located on one side of the primary coil 32, is distributed around the primary charge coil 32 to further assist in guiding the left-right position of a vehicle relative thereto. Other arrangements are, of course, also contemplated.

Figure 3A:
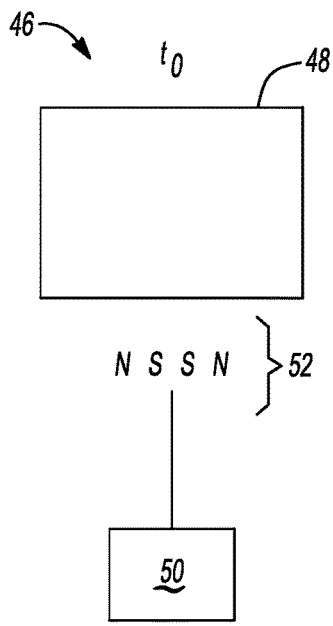
FIGS. 3A, 3B, and 3C are schematic diagrams, in plan view, of a portion of another battery charging facility.
Figure 3B:
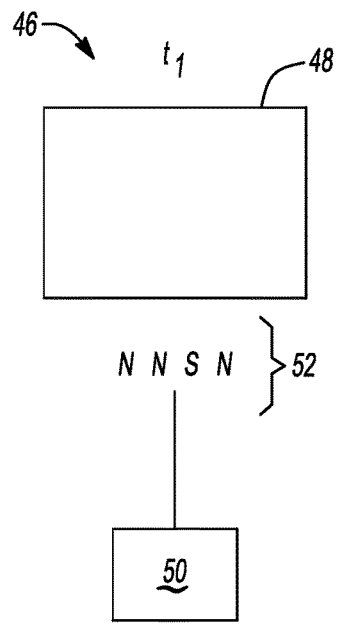
Figure 3C:
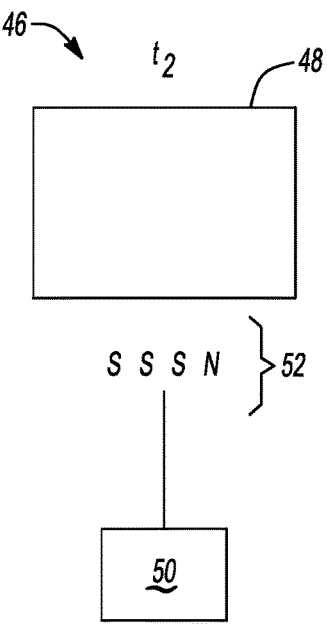

The examples discussed so far refer to arrays of permanent magnets. Some or all of the magnets of an array, however, may be electromagnets. In such arrangements, the polarity signatures may be changed to update the data encoded therein as desired, or changes in polarity may be used to encode data. To this end, referring to FIGS. 3A through 3C, a portion of a battery charging facility 46 includes a primary coil 48, a controller 50, and an electromagnet array 52. The electromagnet array 52 may be part of a larger array that includes other electromagnets and/or permanent magnets.

The electromagnet array 52 is shown at three different points in time: $t_0$, $t_1$, and $t_2$. Changes in the polarity signature may take place between charge operations (that is, between vehicle use) or during use by a single vehicle. So instead of the polarity signature itself completely encoding data, reversals in polarity may also be used to encode data. The polarity signature in this example is shown to switch from "N S S N,"

to "N N S N," to "S S S N." This progression can be used to identify the primary coil 48 and/or to communicate charge related (or other) parameters.

Messages concerning the polarity reversal to be performed by the controller 50 or detected by a vehicle (not shown) can be exchanged before and/or after such reversal is performed and/or detected. As an example, the controller 50, prior to initiating pole reversal, may communicate to a vehicle the progression to be performed. As another example, a vehicle, after completion of the pole reversal, may communicate to the controller 50 the progression detected, etc.

Magnetic arrays need not only be mounted in-ground and associated with primary coils of charge stations. Vehicles may include similar magnetic arrays associated with their secondary coils to assist charge stations in positioning movable primary coils relative to secondary coils, and to encode charge related (or other) parameters. That is, the concepts previously disclosed herein with respect to the magnet arrays of FIGS. 2 and 3A through 3C also analogously apply to the vehicle mounted magnetic arrays disclosed herein.

Figure 4:
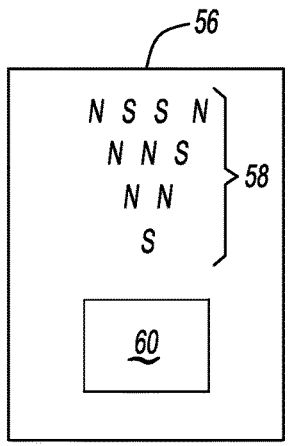
FIG. 4 is a schematic diagram, in plan view, of portions of another vehicle power system.

Referring to FIG. 4, a vehicle 56 includes a permanent magnet array 58 and secondary coil 60. As suggested above, magnetometers of a charge station (not shown) may be used to detect and move a primary coil into position relative to the secondary coil 60 Likewise, the polarity signatures of the permanent magnet array 58 may be used to encode data regarding the identity and/or charge capabilities of the vehicle 56 for use by the charge station.

Figure 5A:
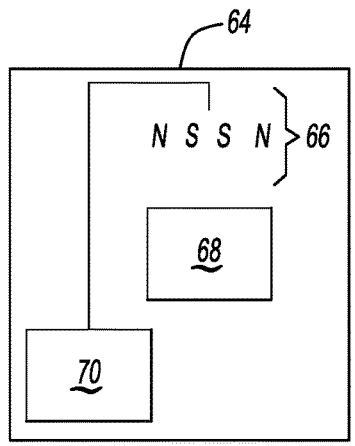
FIGS. 5A and 5B are schematic diagrams, in plan view, of portions of yet another vehicle power system.
Figure 5B:
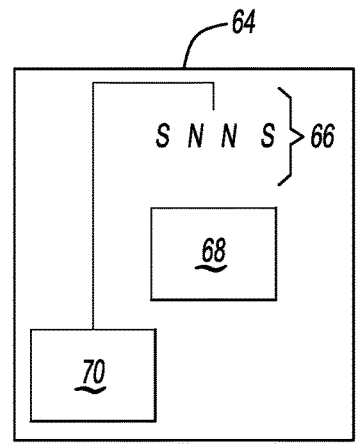

Referring to FIGS. 5A and 5B, a vehicle 64 includes an electromagnet array 66 (which may be part of a larger magnet array), a secondary coil 68, and a controller 70. The controller 70 may cause the polarity of the electromagnets of the electromagnet array 66 to change to encode data regarding the identity and/or charge capabilities of the vehicle 64 for use by a charge station as discussed elsewhere herein.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A charging facility comprising:
   a primary coil;
   electromagnets arranged relative to the primary coil in a pattern, wherein fields generated by the electromagnets can be used to position a secondary coil of a vehicle relative to the primary coil, and the electromagnets have a predefined polarity signature encoding data regarding an identity of the primary coil; and
   a controller programmed to alter a polarity of the electromagnets to further encode data in the electromagnets, and to receive information from the vehicle about the identity of the primary coil.

2. The charging facility of claim 1, wherein the identity includes coil-type.

3. A charging facility comprising:
   a primary coil;
   electromagnets arranged relative to the primary coil in a pattern, wherein fields generated by the electromagnets can be used to position a secondary coil of the vehicle relative to the primary coil, and the electromagnets have a predefined polarity signature encoding data regarding a charge rate associated with the primary coil; and
   a controller programmed to alter a polarity of the electromagnets to further encode data in the electromagnets.

4. A vehicle comprising:
   a secondary coil;
   electromagnets arranged relative to the secondary coil in a pattern, wherein fields generated by the electromagnets can be used to position the secondary coil relative to a primary coil of a charging facility, and the electromagnets have a predefined polarity signature encoding data regarding an identity of the vehicle; and
   a controller programmed to alter a polarity of the electromagnets to further encode data in the electromagnets, and to receive information from the charging facility about the identity of the vehicle.

\* \* \* \* \*